United States Patent [19]
Castelli et al.

[11] Patent Number: 4,712,843
[45] Date of Patent: Dec. 15, 1987

[54] STORAGE BOX FOR PERSONAL COMPUTER INTERIOR

[76] Inventors: Joseph Q. Castelli, 1563 Glencrest Dr., San Jose, Calif. 95118; Don L. Johnson, 19467 Dorchester Dr., Saratoga, Calif. 95070

[21] Appl. No.: 885,604

[22] Filed: Jul. 14, 1986

[51] Int. Cl.⁴ .................. A47B 63/00; B65D 85/57
[52] U.S. Cl. ........................ 312/242; 53/396; 53/390; 206/444; 220/318; 312/7.2; 358/254; 361/331
[58] Field of Search ............... 206/320, 444; 220/318; 312/7.1, 7.2, 242; 358/254; 361/331; 53/396, 168

[56] References Cited

U.S. PATENT DOCUMENTS

| | | | |
|---|---|---|---|
| 3,008,785 | 11/1961 | Gehrs | 312/242 |
| 3,620,404 | 11/1971 | Grasso | 312/242 |
| 4,076,350 | 2/1978 | Crist | 312/242 |
| 4,245,872 | 1/1981 | Kakigi | 312/242 |
| 4,283,099 | 8/1981 | Burton | 312/242 |
| 4,313,584 | 2/1982 | Fukunaga | 312/242 |
| 4,600,249 | 7/1986 | Anderson | 312/7.2 |

*Primary Examiner*—Jimmy G. Foster
*Attorney, Agent, or Firm*—Gerald L. Moore

[57] ABSTRACT

The method and apparatus for providing a storage enclosure in a personal computer housing (9) comprising a box structure (25) having at least one side wall (28) with threaded openings (32) for receiving screws (35) passed through a side panel (36) to hold the box structure in the position normally occupied by a disk drive. The open end is closed by a panel (41) held in place by one or more tongues (56) which interfit in openings (58) in the box structure and which are actuated by a handle (51).

2 Claims, 5 Drawing Figures

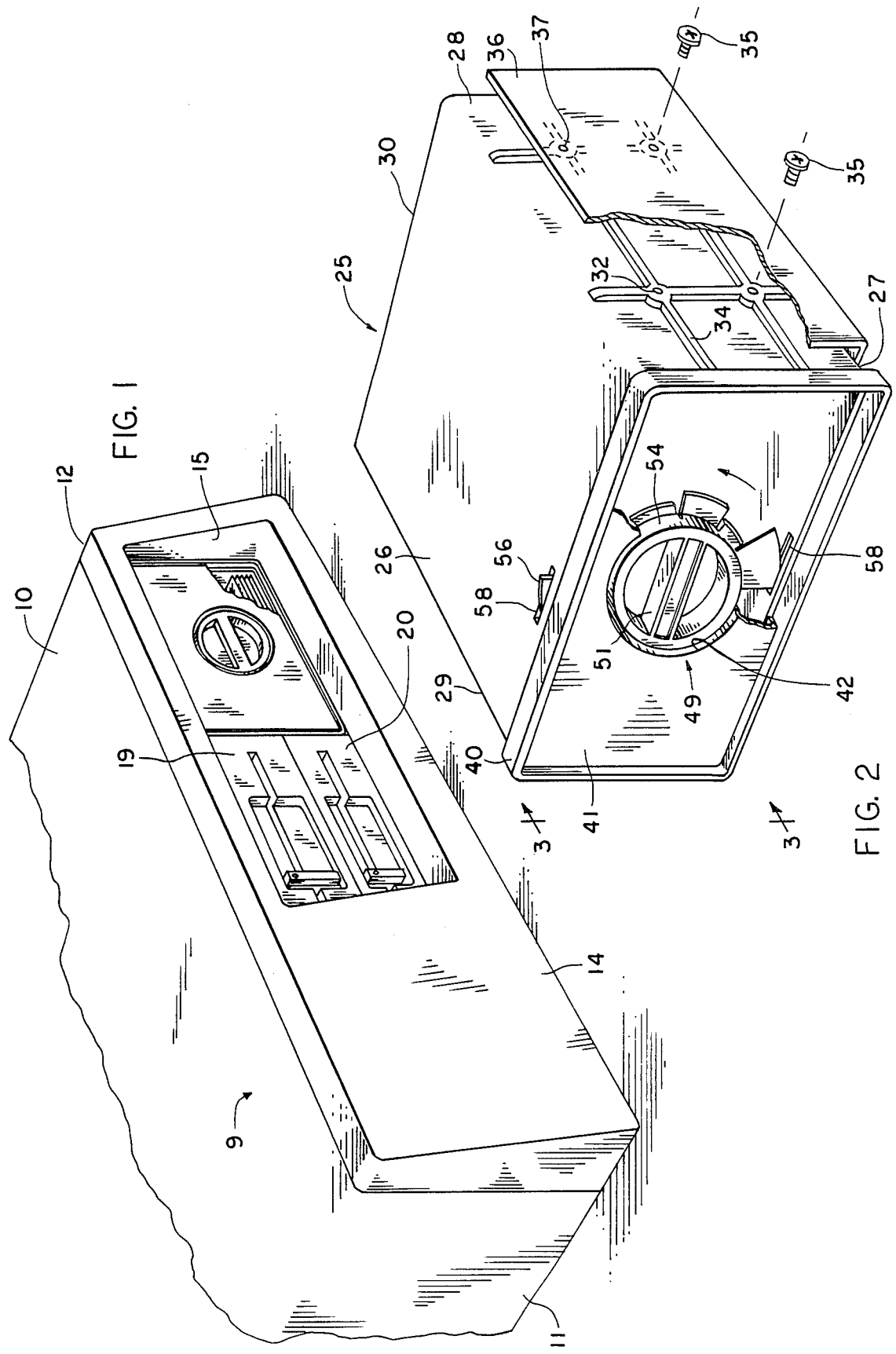

STORAGE BOX FOR PERSONAL COMPUTER INTERIOR

FIELD OF THE INVENTION

This invention relates to a storage box that fits into the disk drive slot of a personal computer.

BACKGROUND OF THE INVENTION

In most desktop computers, commonly referred to as personal computers, there exists two slots opening to the front in the computer cabinet in which can be located various types of disk drives. The slots are sized to fit the standard height drive. With the advent of the one half high drive, two drives can now be fitted into a single slot thereby leaving open the other slot; or if a combination of a hard disk and a half high floppy disk are used there is a half size slot left open.

In the past the open slots have been covered by a front plate. However there always exists the necessity to store recording disks or other items commonly used with the computer. It is the purpose of the present invention to make use of the available space normally occupied by a disk drive for additional storage of computer accessories.

SUMMARY OF THE INVENTION

The method and apparatus for converting a disk drive slot in a personal computer for storage, comprising the steps of inserting into the disk drive slot a box assembly having top and bottom wall members joined by two side walls and one end wall thereby leaving an open end, fixing the box structure into the computer by inserting screws through the side panel normally used for holding disk drives and into the box structure, and thereafter covering the open end thereof with a door having a latch which when turned, interlocks with the box structure to hold the door in place.

DESCRIPTION OF THE DRAWINGS

FIG. 1 is a perspective view of the front of a representative personal computer cabinet with the invention inserted;

FIG. 2 shows the storage box with a portion of the computer side panel;

DESCRIPTION OF A PREFERRED EMBODIMENT

Figure 4:
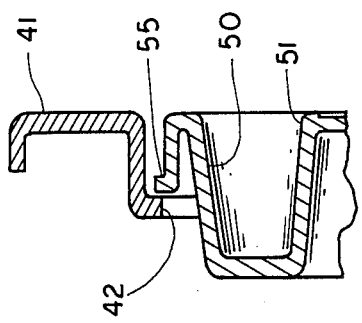
FIGS. 4 and 5 are cross sectional views along the lines 4—4 and 5—5 of FIG. 3.
Figure 5:
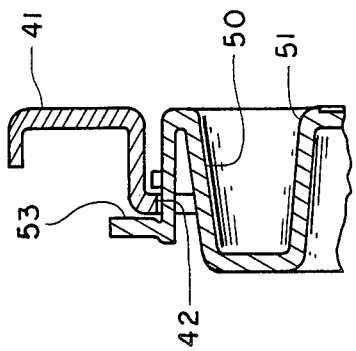
Figure 3:
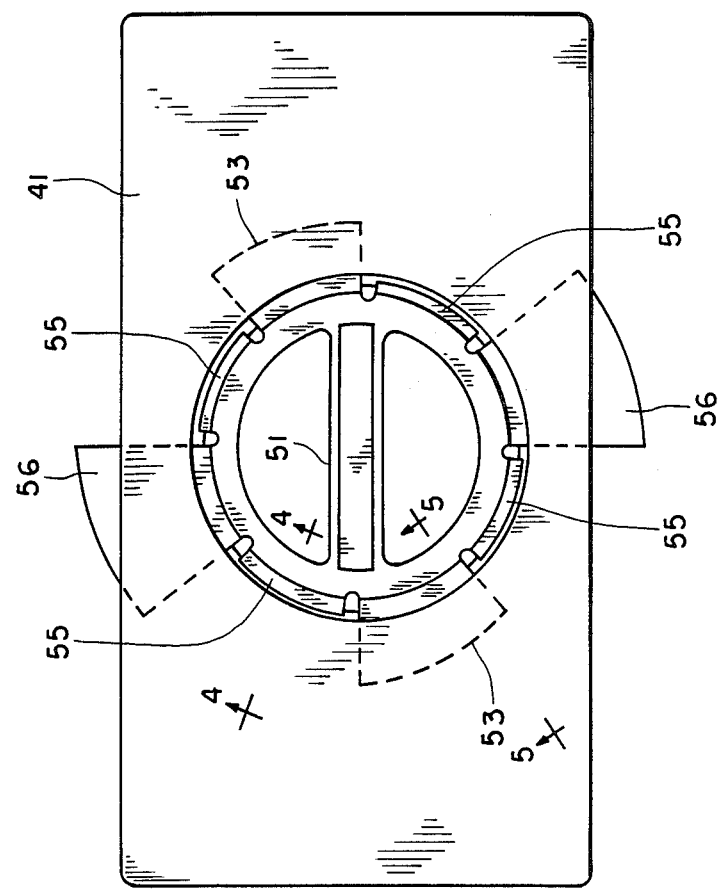
FIG. 3 is an enlarged front view of the storage box.

FIG. 1 is a partial view of a personal computer housing 9 having a top wall 10, side walls 11 and 12, and a front wall 14. In the front wall is an opening 15 connecting with an internal compartment of a size normally capable of receiving two normal size floppy disk drives in side-by-side relationship. In the illustration two half high floppy disk drives 19 and 20 are positioned to one side occupying a slot normally occupied by a regular size disk drive. This leaves a slot to the right side which normally would receive a standard height disk drive. The purpose of the invention is to enable the use of this space for storage.

Fitted into the right hand slot is a box structure 25 comprising a top wall 26, a bottom wall 27, side walls 28 and 29 and one end wall 30 leaving one end open. The box is positioned with the open end facing outward and coinciding with the front opening in the front wall 14 of the computer. Means to hold the box in the opening comprises threaded holes 32 formed at the intersection of the ridge structures 34 in the box structure to receive threaded screws 35. These screws are passed through the side panel 36 normally used to hold the disk drives. The screws pass through openings 37 in the panels and are threaded into the holes 32 in the box structure. Preferably a similar structure is positioned on the other side of the box structure.

To close the front of the box, a door 40 is provided comprising a planar panel 41 having an opening 42 therein. Means for holding the door in place comprises a combined lock and door handle 49 preferably formed of one piece and comprising a circular cup-shaped member 50 having formed across the front a handle 51 which can be grasped for the door. For locking the latch assembly in place the outer surface 54 fits into the opening 42 of the panel such that by pressing the latch into the opening, the spring members 55 will snap past the panel while the lateral projections 53 bear against the inside of the panel to thereafter hold the latch in place while permitting rotation.

Fixed to the latch are a plurality of planar laterally extending tongues 56 which can be rotated to fit into slots 58 in the top wall and the bottom wall of the box structure. In this manner the door is locked in place and removed in one simple motion by grasping the projection 51, turning the latch, and thereafter pulling the panel outward.

I claim

1. The combination of:

A computer having a cabinet including a compartment opening to the outside and enclosing a side panel for attachment of a disk recording device; and a box sized to fit within said compartment and having a bottom and top wall, two side walls and one end wall thereby leaving one end open for access to said box interior;

means to fix said box to said cabinet side panel in a position with said open end facing outward from said cabinet and all the other walls fitting within the cabinet in place of said disk recording device; and a cover for fitting over said box open end with means for attachment to said box thereby to form a closed storage compartment in said computer cabinet in place of a disk recording device.

2. The method of providing storage in a computer cabinet having an empty compartment normally housing a disk drive held in by screws passing through a panel internal to the cabinet, said method comprising:

providing a box structure formed of four side walls and one end wall and having the approximate outside dimensions of the disk drive with one end open for access to the box structure interior;

inserting the box structure into said empty compartment with the open end facing outward of said cabinet;

fastening said box structure in said cabinet by passing screws through said panel and into said box structure; and closing the open end of said box structure with a planar closure having means for attachment to said box structure wherein said means for attachment includes forming openings in two or more of said box structure walls and attaching movable planar tongues to said planar closure in position to enter said openings and hold the closure in the open end of the box structure.

* * * * *